United States Patent
Yasui et al.

(10) Patent No.: US 6,344,805 B1
(45) Date of Patent: Feb. 5, 2002

(54) PARKING CONDUCT DEVICE AND PARKING CONDUCT METHOD

(75) Inventors: Nobuhiko Yasui, Moriguchi; Atsushi Iisaka, Takatsuki; Yoshiki Ueyama, Sakai, all of (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/560,560

(22) Filed: Apr. 28, 2000

(30) Foreign Application Priority Data

Apr. 28, 1999 (JP) .......................... 11-122105

(51) Int. Cl.⁷ .............................. B60Q 1/48
(52) U.S. Cl. ............... 340/932.2; 340/438; 180/6.2; 180/204; 318/580; 701/23; 701/41
(58) Field of Search .............. 340/932.2, 438, 340/903; 180/204, 446, 167, 168, 169, 6.2, 6.24; 701/23, 25, 41; 318/580

(56) References Cited

U.S. PATENT DOCUMENTS

| 4,931,930 A | | 6/1990 | Shyu et al. | |
|---|---|---|---|---|
| 5,173,881 A | * | 12/1992 | Sindle | 367/101 |
| 5,742,141 A | * | 4/1998 | Czekaj | 318/587 |
| 5,931,252 A | * | 8/1999 | Shimizu et al. | 180/204 |
| 6,070,684 A | * | 6/2000 | Shimizu et al. | 180/204 |

FOREIGN PATENT DOCUMENTS

| DE | 196 46 559 | 5/1998 |
|---|---|---|
| EP | 0 650 866 | 5/1995 |
| EP | 0 900 712 | 3/1999 |
| JP | 07114700 | 5/1995 |

OTHER PUBLICATIONS

Patent Abstract of Japan, vol. 1997, No. 07, Publication No. 09062824, Mar. 7, 1997.
Patent Abstract of Japan, vol. 1997, No. 3, Publication No. 08287398, Nov. 1, 1996.
Patent Abstract of Japan, vol. 1999, No. 9, Publication No. 11066490, Mar. 9, 1999.

* cited by examiner

*Primary Examiner*—Jeffery Hofsass
*Assistant Examiner*—Davetta W. Goins
(74) *Attorney, Agent, or Firm*—Wenderoth, Lind & Ponack, L.L.P.

(57) ABSTRACT

A vehicle position calculation unit (1) calculates a position of a vehicle on a plan view, and an estimate locus calculation unit (2) calculates an estimate movement locus of a vehicle body when the vehicle is moved at a maximum steering angle with respect to the vehicle position, and a display unit (3) displays the vehicle position calculated by the vehicle position calculation unit (1) together with the estimate locus of the vehicle body calculated by the estimate locus calculation unit (2). Thus, even a beginner driver of the vehicle can easily and quickly park the vehicle with accuracy and safety while monitoring the estimate movement locus of the vehicle on the display screen.

23 Claims, 4 Drawing Sheets

PARKING CONDUCT DEVICE AND PARKING CONDUCT METHOD

BACKGROUND OF THE INVENTION

1. Field of the Invention

The present invention is generally relates to a parking conduct device and method thereof for conducting or guiding a parking of a vehicle, and in particular to a parking conduct device and method of displaying a position of a vehicle on a plan view with calculating an estimate movement locus of a vehicle body when the vehicle is moved at a predetermined steering angle with respect to the vehicle position. Thus, a driver of the vehicle can easily and quickly park the vehicle with accuracy and safety while monitoring the estimate movement locus of the vehicle on a display screen.

2. Description of the Prior Art

Figure 5:
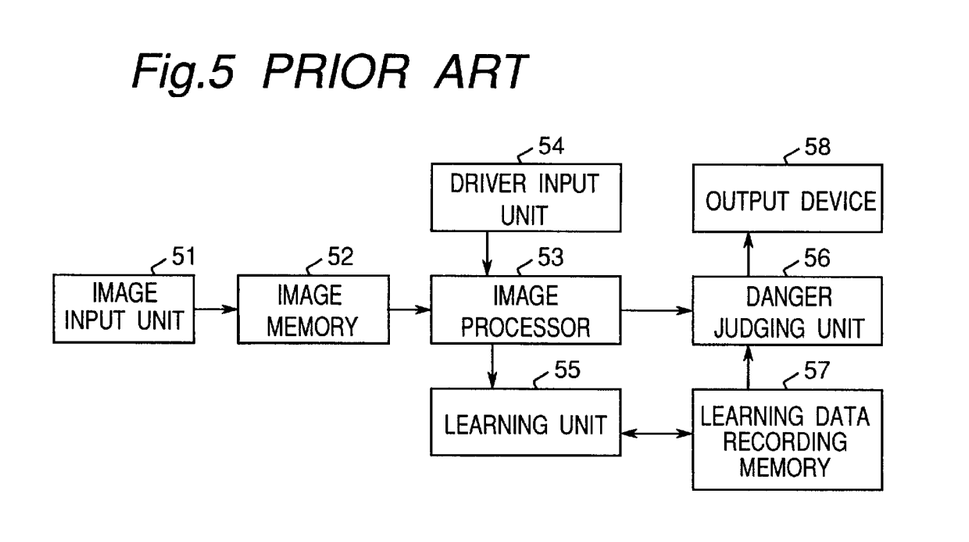
FIG. 5 is a block diagram showing a configuration of a conventional parking conduct device.

In order to facilitate a smooth parking of a vehicle in a parking lot, a conventional parking conduct device of a loaded-on-vehicle type is suggested, for example, in Japanese Patent Laid Open Unexamined Publication 7-114700 (in 1995), a block construction example thereof being shown in FIG. 5.

In FIG. 5, the conventional parking conduct device includes an image input unit 51 for picking up an image of a surrounding sight of the vehicle, an image memory 52 for storing the input image data, an image processor unit 53 for extracting features of the input image data, a driver input unit 54 for the driver to operate such as a starting of a parking, a learning unit 55 for learning the processed image data, a learning data recording memory 57 for recording the learned results, a danger judging unit 56 for judging danger by comparing the input image with the learned data, and an output unit 58 for generating a warning alarm to the driver.

In this conventional construction, the image input unit 51 such as an image pickup camera is attached to a rear part of the vehicle to pick up an image of a backward sight picture outside the vehicle. The input image is stored in the image memory 52. Based on the input image stored in the image memory 52, the image processor unit 53 extracts information of the backsight picture, for example, existence of a wall or a pole standing, or a block placed. Then, the driver executes the starting operation of the parking by means of the driver input unit 54 and the resultant image data processed by the image processor unit 53 is learned by the learning unit 55. The learned resultant data is recorded in the learning data recording memory 57. The learned resultant data stored in the the learning data recording memory 57 and the input image of the backsight picture output of the image processor unit 53 are compared by the danger judging unit 56. Based on the comparison result, when it is judged to be danger to park the vehicle as it is, the output device 58 gives, for example, a warning alarm to the driver.

In this conventional technique, however, since the danger is merely judged based on the comparison between the input image data and the learned resultant data, it was still difficult for a beginner having just taken an auto-driving license to park a vehicle, and also difficult for a driver to park an inexperienced vehicle such as a large-sized vehicle of another person. This is because the size of the vehicle body and the actual rotating angle of the wheel with respect to a handle steering angle are both varied according to various different types of vehicles.

SUMMARY OF THE INVENTION

It is an object of the present invention to provide an improved parking conduct device and method thereof for conducting a parking of a vehicle, depicting a position of the vehicle on a plan view with calculating an estimate movement locus of a vehicle body when the vehicle is moved at a predetermined steering angle with respect to the vehicle position, so that a driver of the vehicle can easily and quickly park the vehicle with accuracy and safety while monitoring the estimate movement locus of the vehicle on a display screen.

In order to attain the object, one aspect of the invention provides a parking conduct device which comprises: a vehicle position calculation unit for calculating a position of a vehicle on a plan view; an estimate locus calculation unit for calculating an estimate movement locus of a vehicle body when the vehicle is moved at a predetermined steering angle with respect to the vehicle position calculated by the vehicle position calculation unit; and a display unit for displaying the vehicle position calculated by the vehicle position calculation unit together with the estimate locus of the vehicle body calculated by the estimate locus calculation unit.

In this construction, the predetermined steering angle is the maximum steering angle of the vehicle, and the display unit displays the vehicle position calculated by the vehicle position calculation unit, by superimposing a contour of the vehicle body onto the estimate movement locus of the vehicle body calculated by the estimate locus calculation unit.

Another aspect of the invention provides a parking conduct method which comprises the steps of: calculating a position of a vehicle on a plan view; calculating an estimate movement locus of a vehicle body when the vehicle is moved at a predetermined steering angle with respect to the vehicle position calculated in the vehicle position calculation step; and displaying the vehicle position calculated in the vehicle position calculation step together with the estimate locus of the vehicle body calculated in the estimate locus calculation step.

In this method, the predetermined steering angle is the maximum steering angle of the vehicle, and the display of the vehicle position calculated in the vehicle position calculation step is performed by superimposing a contour of the vehicle body onto the estimate movement locus of the vehicle body calculated by the estimate locus calculation step.

By this arrangement, even a beginner driver of the vehicle can easily and quickly park the vehicle with accuracy and safety while monitoring the estimate movement locus of the vehicle on a display screen.

BRIEF DESCRIPTION OF THE DRAWINGS

The foregoing and other features, aspects and advantages of the invention will become better understood with regard to the following description, appended claims and accompanying drawings in which:

DETAILED DESCRIPTION OF THE PREFERRED EMBODIMENTS

Although the following detailed description contains many specifics for the purposes of illustrations, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
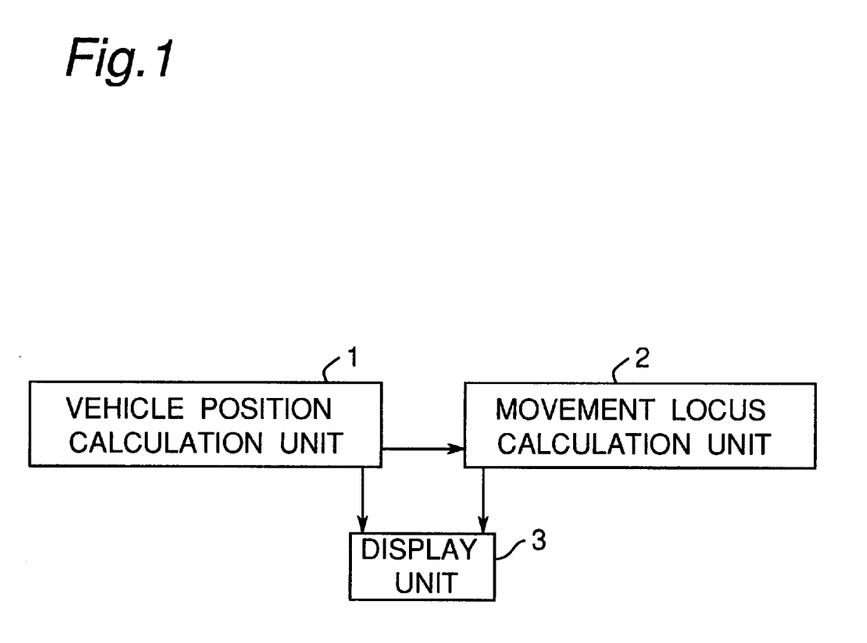
FIG. 1 is a block diagram showing a generic configuration o a parking conduct device according to the present invention.

FIG. 1 shows a schematic block construction of a preferred embodiment of a parking conduct device according to the present invention. In this construction, the parking conduct device includes a vehicle position calculation unit 1, a movement locus calculation unit 2 and a display unit 3. The vehicle position calculation unit 1 has a function of depicting a driver's own vehicle by calculating a position of the vehicle on a plan view to be displayed on a display screen.

The movement locus calculation unit 2 calculates an estimate movement locus of a vehicle body to be displayed when the vehicle is moved at a predetermined steering angle such as a maximum steering angle with respect to the vehicle position calculated by the vehicle position calculation unit 1. The display of the estimate movement locus of the vehicle body includes four corners or four wheels of the vehicle. The display unit 3 for displaying the calculated resultants may be constructed as a display device such as a liquid crystal display integrally combined with the parking conduct device which is installed in a position inside the vehicle for the driver to easily monitor the display on the screen.

Figure 2:
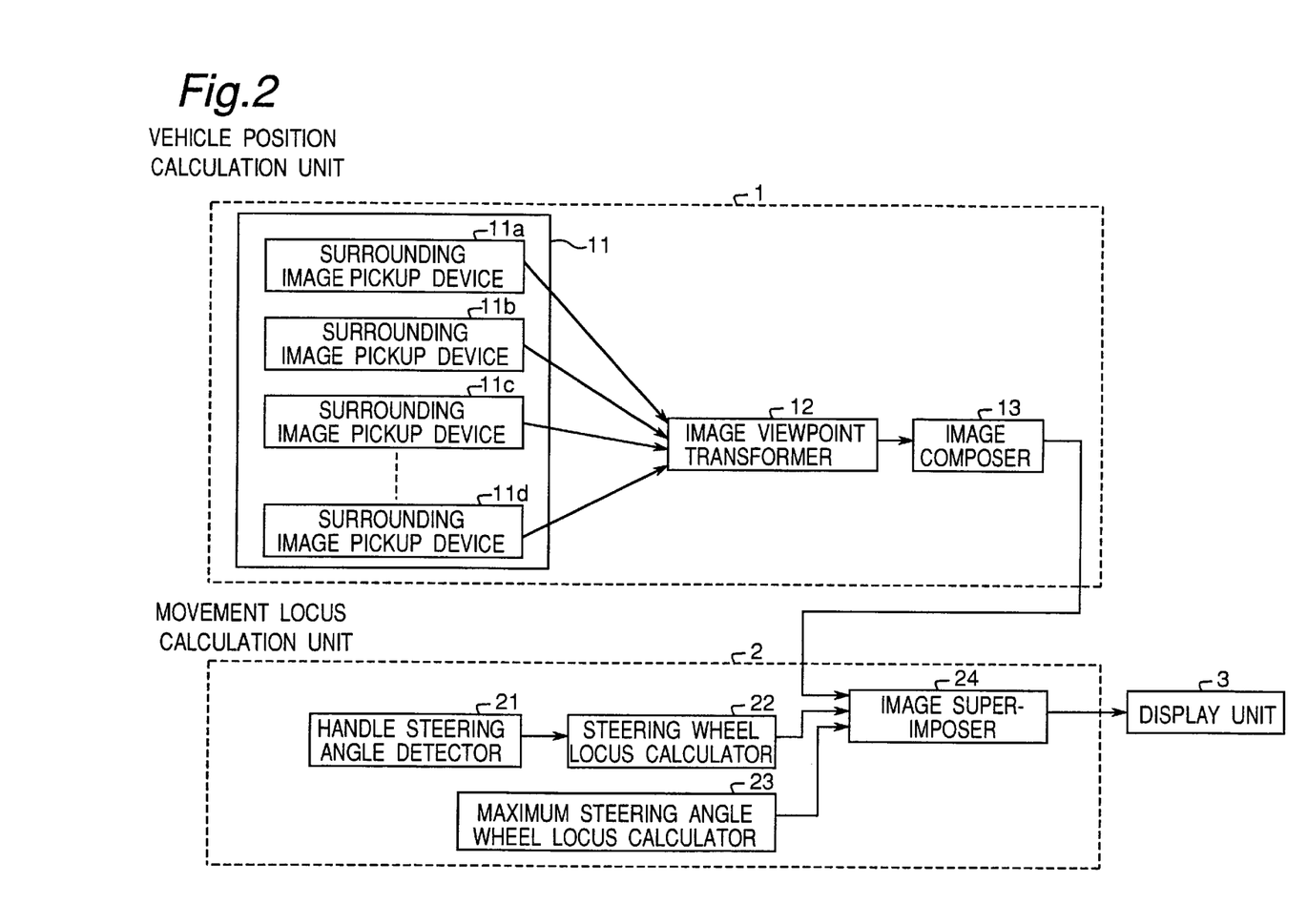
FIG. 2 is a block diagram showing components of a vehicle position calculation unit and a movement locus calculation unit according to the present invention.

FIG. 2 shows an example of constitution components of the parking conduct device comprised of the vehicle position calculation unit 1 and movement locus calculation unit 2. The vehicle position calculation unit 1 includes an image pickup portion 11, an image viewpoint transformer portion 12 and an image composer portion 13. The image pickup portion 11 is comprised of a plurality of vehicle surrounding image pickup devices 11a, 11b, 11c, . . . , 11d which may be comprised of one or more image pickup cameras fixedly mounted on predetermined outer periphery positions of the vehicle. The plurality of the pickup devices 11a, 11b, 11c, . . . , 11d have a function of an image input means so that each of the image pickup devices picks up a sight picture image of surroundings of the vehicle to generate the image data thereof which is applied to the image viewpoint transformer portion 12.

The image viewpoint transformer portion 12 forms a bird's-eye view of the surrounding sight picture based on the image data generated by the image pickup portion 11 by way of a projection transformation process to transform the input image data of the surrounding sight picture in order to depict the vehicle position from optional viewpoints in the bird's-eye view of the surrounding sight picture.

The image composer portion 13 depicts a composite image using the bird's-eye view of the surrounding sight picture obtained by the image viewpoint transformer portion 12. Thus, the vehicle body composed on the bird's-eye view of the surrounding sight picture is depicted on the plan view. The resultant depicted composite image of the vehicle body composed on the bird's-eye view of the surrounding sight picture is transmitted from the image composer portion 13 to the movement locus calculation unit 2.

The movement locus calculation unit 2 includes a handle steering angle detector portion 21, a steering wheel locus calculator portion 22, a maximum steering angle wheel locus calculator portion 23, and an image superimposer portion 24.

The handle steering angle detector portion 21 is secured to a fixed position of a handle mechanism to detect a handle steering angle. The steering wheel locus calculator portion 22 receives the detected handle steering angle to thereby calculates an estimate movement locus of the vehicle to be assumed to move based on the handle steering angle. The maximum steering angle wheel locus calculator portion 23 calculates a vehicle wheel locus when the vehicle is moved at the maximum handle steering angle.

The estimate movement locus of the vehicle obtained by the steering wheel locus calculator portion 22 or the maximum steering angle wheel locus obtained by the maximum steering angle wheel locus calculator portion 23 is applied to the image superimposer portion 24 so that the applied steering wheel locus is superimposed to the composite image of the vehicle body transmitted from the image composer portion 13. The resultant superimposed image obtained by the image superimposer portion 24 is displayed on the display screen of the display unit 3 to be monitored by the driver.

Figure 3:
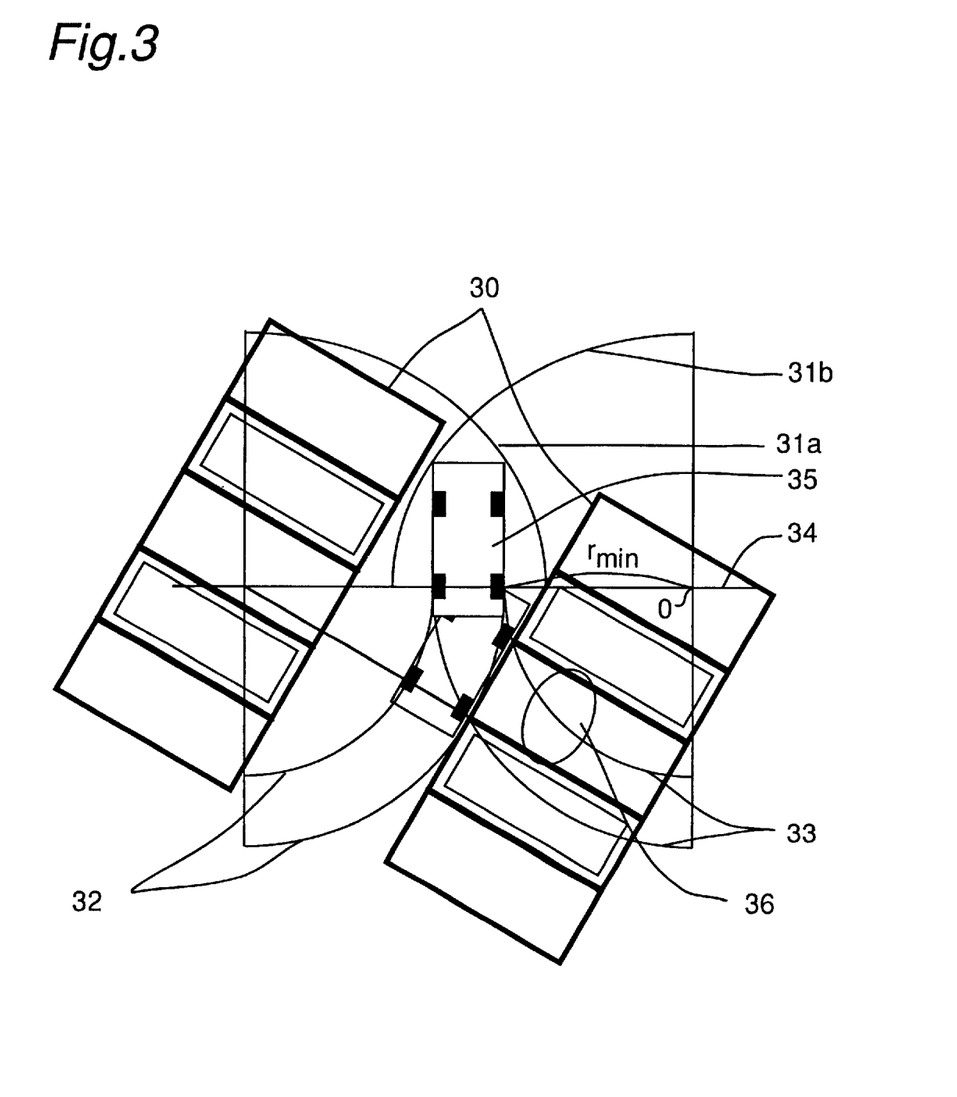
FIG. 3 is an explanatory view showing an example of a displayed picture on a display screen according to the present invention.
Figure 4:
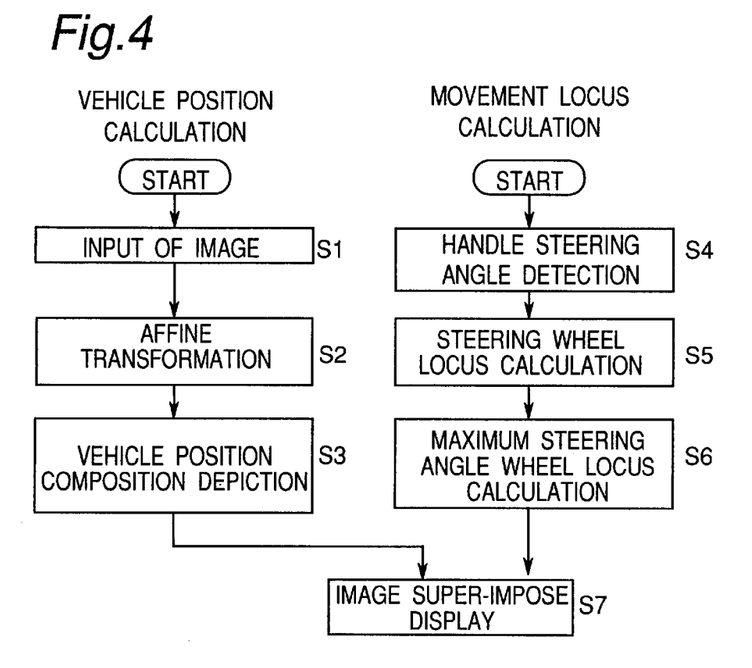
FIG. 4 is a flow chart for explaining an operation of the parking conduct device according to the present invention.

The following describes an operation of the parking conduct device of the present embodiment with reference to FIGS. 3 and 4, where FIG. 3 shows an example of a displayed contents displayed on the screen of the display unit 3 and FIG. 4 shows a flow chart for explaining the operation.

In the operation of the vehicle position calculation unit 1, as shown in FIG. 3, boundary lines 30 of parking partitions are displayed on a plan view of the display screen and a vehicle position or a contour of the vehicle body is displayed on the plan view of the screen in association with the parking partitions to be monitored by the driver. In this example shown in FIG. 3, a parking lot is allocated to ten partitions by, e.g., white boundary lines having a parking capacity of e.g., ten cars of which four cars have been already stored.

An outstanding vehicle (35) in relation to the parking partitions 30 on the plan view is displayed in a manner as described below.

In the first step S1, a surrounding sight picture outside the vehicle is picked up by a plurality of image pickup devices such as cameras which are securely attached to predetermined positions of the vehicle. The input image data of the surrounding sight picture is transformed to a bird's-eye view by way of an affine transformation process in step S2. Then, the image composer portion 13 depicts a composite image of the vehicle body composed with the bird's-eye view of the surrounding sight picture in step S3.

Next, in the example of the operation of the movement locus calculation unit 2 as shown in FIG. 3, an estimate locus of the vehicle position is displayed in the case where the vehicle body obtained in the operation of the vehicle position calculation unit 1 is first moved forward at a predetermined steering angle for leftward turning rotation and is then moved backward at a predetermined steering angle for rightward turning rotation. In this display operation, firstly, the handle steering angle of the vehicle is detected by the handle steering angle detector portion 21 attached to the handle position in step S4. Subsequently in step S5, an estimate locus of the vehicle position to be moved is calculated by the steering wheel locus calculator portion 22 based on the handle steering angle detected in step S4 with respect to the composite image of the vehicle body composed obtained in step S3.

In this example, the maximum steering angle may be used as the predetermined steering angles for both leftward and rightward turning rotations so that the maximum steering angle wheel locus is calculated to be displayed in step S6 by means of the maximum steering angle wheel locus calculator portion 23 assuming that the vehicle is moved at the maximum handle steering angle. Then, in step S7, the estimate locus of the vehicle movement calculated in the steering wheel locus calculation step S5 is superimposed with the composite image of the vehicle body obtained in the image composing step S3. In this example, the maximum steering angle wheel locus calculated in step S6 is used to be superimposed with the composite image of the vehicle body. The resultant superimposed image obtained in sep S7 is displayed on the display screen to be monitored by the driver.

Specifically, in the example shown in FIG. 3, the estimate movement loci of the four corners of the vehicle body 35, namely, a forward movement locus 31a of a right front corner, a backward movement locus 31b of a left front corner, a forward movement locus 32 of right and left rear corners, and backward movement loci 33 of the right and left rear corners are depicted on the display screen as the estimate locus of the vehicle movement. In this arrangement, the backward movement loci 33 can be depicted based on the minimum rotation radius $r_{min}$ defined according to the maximum steering angle of the vehicle together with the fixed vehicle body size on the premise that a rotation center 0 of the loci is located on a straight line 34 passing through the centers of the right and left rear wheels.

When a driver parks a vehicle using the parking conduct device of the present invention, the display contents are displayed on the screen of the display unit 3 as shown in FIG. 3 so that the driver operates the handle steering while monitoring the display screen. When the vehicle is moved forward at the predetermined steering angle for leftward turning rotation, the vehicle is stopped at a position 35 in FIG. 3 where the estimate loci 33 of the rear corners of the vehicle body are in parallel to the side boundary lines of a target parking partition. Then, the driver operates the handle steering angle to be maximum for rightward turning rotation and moves the vehicle backward at the maximum steering angle under the same condition while monitoring the vehicle position on the display screen. When the vehicle is moved back to a position 36 within the target patition as shown in FIG. 3 where the vehicle body is in parallel to the both side boundary lines of the target patition, the driver returns back the handle to the original condition, namely, the condition of the steering angle equal to zero. Then, the vehicle is straightly moved backward to be thereby accurately parked within the target partition. In this arrangement, the handle steering angle may be displayed on the screen along the vehicle body on the plan view shown in FIG. 3.

In the present embodiment, although a plurality of image pickup cameras are used for forming a bird's-eye view, a single image pickup camera may be used therefor.

Moreover, the maximum steering angle is used as the predetermined steering angle to calculate the maximum steering angle wheel locus in step S6. This is because for a beginner driver of a car to facilitate a quick and accurate parking of the car. However, it is not limited to this and other predetermined steering angle may be, of course, used therefor.

As described above, according to a first aspect of the present invention, a parking conduct device comprises: a vehicle position calculation unit for calculating a position of a vehicle on a plan view; an estimate locus calculation unit for calculating an estimate movement locus of a vehicle body when the vehicle is moved at a predetermined steering angle with respect to the vehicle position calculated by the vehicle position calculation unit; and a display unit for displaying the vehicle position calculated by the vehicle position calculation unit together with the estimate locus of the vehicle body calculated by the estimate locus calculation unit.

In this construction, the predetermined steering angle is the maximum steering angle of the vehicle, and the display unit displays the vehicle position calculated by the vehicle position calculation unit, by superimposing a contour of the vehicle body onto the estimate movement locus of the vehicle body calculated by the estimate locus calculation unit.

In addition, the display of the estimate locus of the vehicle body calculated by the estimate locus calculation unit includes a display of four corner parts of the vehicle including four wheels, and the display of the estimate locus of the vehicle body calculated by the estimate locus calculation unit includes a display of a line passing through the centers of rear wheels.

The vehicle position calculation unit includes: an image input portion for picking up a picture of surroundings of the vehicle to generate image data thereof; a bird's-eye view forming portion for forming a bird's-eye view of the surrounding picture based on the image data generated by the image input portion; and an image composing portion for depicting a composite image of the vehicle body composed on the bird's-eye view of the surrounding picture.

In this construction, the estimate locus calculation unit includes: a steering angle detection portion for detecting a handle steering angle of the vehicle; a steering wheel locus calculation portion for calculating an estimate locus of the vehicle position to be moved based on the handle steering angle; and an image superimposing portion for superimposing the estimate locus of the vehicle movement calculated by the steering wheel locus calculation portion with the composite image of the vehicle body depicted by the image composing portion.

The estimate locus calculation unit may further include a maximum steering angle wheel locus calculation portion for calculating a vehicle wheel locus when the vehicle is moved at the maximum handle steering angle.

According to a second aspect of the present invention, a parking conduct method comprises steps of: calculating a position of a vehicle on a plan view; calculating an estimate movement locus of a vehicle body when the vehicle is moved at a predetermined steering angle with respect to the vehicle position calculated in the vehicle position calculation step; and displaying the vehicle position calculated in the vehicle position calculation step together with the estimate locus of the vehicle body calculated in the estimate locus calculation step.

In this method, the predetermined steering angle is the maximum steering angle of the vehicle, and the display of the vehicle position calculated in the vehicle position calculation step is performed by superimposing a contour of the vehicle body onto the estimate movement locus of the vehicle body calculated by the estimate locus calculation step.

The vehicle position calculation step includes: an image input step for picking up a picture of surroundings of the vehicle to generate image data thereof; a bird's-eye view forming step for forming a bird's-eye view of the surrounding picture based on the image data generated in the image input step; and an image composing step for depicting a composite image of the vehicle body composed on the bird's-eye view of the surrounding picture.

In this method, the display of the vehicle position includes boundary lines of parking partitions and a backward movement of the vehicle is started when the displayed estimate locus of the vehicle body is in parallel to the boundary lines of a target parking partition.

As described above, according to the present invention, a position of a vehicle on a plan view is calculated to be displayed in relation to partition lines of a parking lot, and an estimate movement locus of a vehicle body or vehicle wheels when the vehicle is moved back with a minimum rotation radius, i.e., at a maximum steering angle with respect to the vehicle position so that the vehicle position calculated in the vehicle position calculation together with the estimate locus of the vehicle body calculated in the estimate locus calculation is displayed on the display screen. Thus, even a beginner driver of the vehicle can easily and quickly park the vehicle with accuracy and safety while monitoring the estimate movement locus of the vehicle on the display screen.

While the invention has been described in connection with what is presently considered to be the most practical and preferred embodiments, it is to be understood that the invention is not limited to the disclosed embodiments, but on the contrary it is intended to cover various modifications and equivalent arrangements included within the spirit and scope of the appended claims.

What is claimed is:

1. A parking conduct device for use with a vehicle having a vehicle body, said device comprising:
   a vehicle position calculation unit operable to calculate a position of the vehicle on a plan view;
   an estimated locus calculation unit operable to calculate an estimated movement locus of the vehicle body when the vehicle is moved at a predetermined steering angle with respect to the vehicle position calculated by said vehicle position calculation unit; and
   a display unit operable to display the vehicle position calculated by said vehicle position calculation unit together with the estimated locus of the vehicle body calculated by said estimated locus calculation unit.

2. The parking conduct device according to claim 1, wherein the predetermined steering angle is the maximum steering angle of the vehicle.

3. The parking conduct device according to claim 1, wherein said display unit is operable to display the vehicle position calculated by said vehicle position calculation unit, by superimposing a contour of the vehicle body onto the estimated movement locus of the vehicle body calculated by said estimated locus calculation unit.

4. The parking conduct device according to claim 1, wherein said display unit is operable to display four corner parts of the vehicle including four wheels when displaying the estimated locus of the vehicle body calculated by said estimated locus calculation unit.

5. The parking conduct device according to claim 1, wherein said display unit is operable to display a line passing through the centers of rear wheels of the vehicle when displaying the estimated locus of the vehicle body calculated by said estimated locus calculation unit.

6. The parking conduct device according to claim 1, wherein said vehicle position calculation unit includes: an image input portion operable to pick up a picture of surroundings of the vehicle to generate image data thereof, a bird's-eye view forming portion operable to form a bird's-eye view of the surrounding picture based on the image data generated by said image input portion; and an image composing portion operable to depict a composite image of the vehicle body composed on the bird's-eye view of the surrounding picture.

7. The parking conduct device according to claim 6, wherein said estimated locus calculation unit includes: a steering angle detection portion operable to detect a handle steering angle of the vehicle; a steering wheel locus calculation portion operable to calculate an estimated locus of the vehicle position to be moved based on the handle steering angle; and an image superimposing portion operable to superimpose the estimated locus of the vehicle movement calculated by said steering wheel locus calculation portion with the composite image of the vehicle body depicted by said image composing portion.

8. The parking conduct device according to claim 7, wherein said estimated locus calculation unit further includes a maximum steering angle wheel locus calculation portion operable to calculate a vehicle wheel locus when the vehicle is moved at the maximum handle steering angle.

9. A parking conduct method for use with a vehicle having a vehicle body, said method comprising:
   calculating a position of the vehicle on a plan view;
   calculating an estimated movement locus of the vehicle body when the vehicle is moved at a predetermined steering angle with respect to the vehicle position calculated in said calculating of the vehicle position; and
   displaying the vehicle position calculated in said calculating of the vehicle position together with the estimated locus of the vehicle body calculated in said calculation of the estimated locus.

10. The parking conduct method according to claim 9, wherein the predetermined steering angle is the maximum steering angle of the vehicle.

11. The parking conduct method according to claim 9, wherein said displaying of the vehicle position includes superimposing a contour of the vehicle body onto the estimated movement locus of the vehicle body.

12. The parking conduct method according to claim 9, wherein said calculating of the vehicle position includes: picking up a picture of surroundings of the vehicle to generate image data thereof; forming a bird's-eye view of the surrounding picture based on the generated image data of the picture of surroundings; and depicting a composite image of the vehicle body composed on the bird's-eye view of the surrounding picture.

13. The parking conduct method according to claim 12, wherein said calculating of the estimated locus includes: detecting a handle steering angle of the vehicle; calculating an estimated locus of the vehicle position to be moved based on the handle steering angle; and superimposing the estimated locus of the vehicle movement with the composite image of the vehicle body.

14. The parking conduct method according to claim 13, wherein said calculation of the estimated locus further includes calculating a vehicle wheel locus when the vehicle is moved at the maximum handle steering angle.

15. The parking conduct method according to claim 13, wherein said displaying of the vehicle position includes displaying boundary lines of a parking partition, and a backward movement of the vehicle is started when the displayed estimated locus of the vehicle body is in parallel to the boundary lines of a target parking partition.

16. A parking conduct device for use with a vehicle having a vehicle body, said device comprising:
- means for calculating a position of the vehicle on a plan view;
- means for calculating an estimated movement locus of the vehicle body when the vehicle is moved at a predetermined steering angle with respect to the vehicle position calculated by said means for calculating the position of the vehicle; and
- means for displaying the vehicle position, calculated by said means for calculating the position of the vehicle, together with the estimated locus of the vehicle body calculated by said means for calculating the estimated movement locus.

17. The parking conduct device according to claim 16, wherein the predetermined steering angle is the maximum steering angle of the vehicle.

18. The parking conduct device according to claim 16, wherein said means for displaying displays the vehicle position, calculated by said means for calculating the position of the vehicle, by superimposing a contour of the vehicle body onto the estimated movement locus of the vehicle body calculated by said means for calculating the estimated movement locus.

19. The parking conduct device according to claim 16, wherein said means for displaying displays four corner parts of the vehicle, including four wheels, when displaying the estimated locus of the vehicle body calculated by said means for calculating the estimated movement locus.

20. The parking conduct device according to claim 16, wherein said means for displaying displays a line passing through the centers of rear wheels of the vehicle when displaying the estimated locus of the vehicle body calculated by said means for calculating the estimated movement locus.

21. The parking conduct device according to claim 16, wherein said means for calculating the position of the vehicle includes:
- means for picking up a picture of surroundings of the vehicle to generate image data thereof;
- means for forming a bird's-eye view of the surrounding picture based on the image data generated by said means for picking up the picture; and
- means for depicting a composite image of the vehicle body composed on the bird's-eye view of the surrounding picture.

22. The parking conduct device according to claim 21, wherein said means for calculating the estimated movement locus includes:
- means for detecting a handle steering angle of the vehicle;
- means for calculating an estimated locus of the vehicle position to be moved based on the handle steering angle; and
- means for superimposing the estimated locus of the vehicle movement with the composite image of the vehicle body.

23. The parking conduct device according to claim 22, wherein said means for calculating the estimated movement locus further includes:
- means for calculating a vehicle wheel locus when the vehicle is moved at the maximum handle steering angle.

* * * * *

UNITED STATES PATENT AND TRADEMARK OFFICE
CERTIFICATE OF CORRECTION

PATENT NO. : 6,344,805 B1
DATED : February 5, 2002
INVENTOR(S) : Nobuhiko Yasui et al.

It is certified that error appears in the above-identified patent and that said Letters Patent is hereby corrected as shown below:

Title page,
Item [57], ABSTRACT,
Line 1, delete "(1)".
Lines 2 and 11, change "estimate" to -- estimated --.
Line 3, delete "(2)"; change "estimate" to -- estimated --.
Line 6, delete "(3)".
Line 7, delete "(1)"; change "estimate" to -- estimated --.
Line 9, delete "(2)".

Column 1,
Line 3, change "relates" to -- related --.
Line 4, delete "thereof".
Line 7, change "with" to -- and --.
Line 12, change "estimate" to -- estimated --.
Line 53, change "taken" to -- received --; change "auto-driving" to -- auto driving --.
Line 54, change "an" to -- a --.
Line 55, delete "inexperienced"; after "vehicle" (first occurrence) insert -- with which the driver is inexperienced --; change "large-sized" to -- large sized --.

Column 2,
Line 2, change "with" to -- and --; change "estimate" to -- estimated --.
Lines 7, 12, 13, 18, 19, 25, 26, 30 and 47, change "estimate" to -- estimated --.
Line 55, change "o" to -- of --.
Line 63, after "chart" insert "-".

Column 3,
Lines 23 and 27, change "estimate" to -- estimated --.
Line 50, delete the paragraph break.

Column 4,
Line 10, change "calculates" to -- calculate --; change "estimate" to -- estimated --.
Lines 15, 54 and 64, change "estimate" to -- estimated --.
Line 28, delete "a".

Column 5,
Lines 10, 19 and 26, change "estimate" to -- estimated --.
Line 16, change "sep" to -- step --.
Line 49, delete "back".
Line 52, change "straightly moved" to -- moved straight --.
Line 61, delete "because".

UNITED STATES PATENT AND TRADEMARK OFFICE
CERTIFICATE OF CORRECTION

PATENT NO. : 6,344,805 B1
DATED : February 5, 2002
INVENTOR(S) : Nobuhiko Yasui et al.

It is certified that error appears in the above-identified patent and that said Letters Patent is hereby corrected as shown below:

Column 6,
Lines 2, 3, 8, 9, 15, 16, 18, 19, 21, 22, 33, 36, 39, 43, 49, 61 and 62, change "estimate" to -- estimated --.
Line 55, change "mate" to -- mated --; change "estimate" to -- estimated --.

Column 7,
Lines 8, 14, 19, 20 and 23, change "estimate" to -- estimated --.

Column 8,
Line 4, change "thereof," to -- thereof; --.

Signed and Sealed this

Sixth Day of December, 2005

JON W. DUDAS
*Director of the United States Patent and Trademark Office*